US009584645B2

(12) United States Patent
Cronin

(10) Patent No.: US 9,584,645 B2
(45) Date of Patent: Feb. 28, 2017

(54) COMMUNICATIONS WITH WEARABLE DEVICES

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 13 days.

(21) Appl. No.: 14/628,074

(22) Filed: Feb. 20, 2015

(65) Prior Publication Data
US 2015/0358451 A1 Dec. 10, 2015

Related U.S. Application Data

(60) Provisional application No. 62/007,897, filed on Jun. 4, 2014.

(51) Int. Cl.
| | |
|---|---|
| *H04M 3/00* | (2006.01) |
| *H04M 1/725* | (2006.01) |
| *H04B 1/3827* | (2015.01) |
| *H04W 68/02* | (2009.01) |

(52) U.S. Cl.
CPC .......... *H04M 1/7253* (2013.01); *H04B 1/385* (2013.01); *H04W 68/02* (2013.01); *H04B 2001/3861* (2013.01); *H04M 1/72563* (2013.01); *H04M 2250/12* (2013.01)

(58) Field of Classification Search
CPC ................. H04M 1/7253; H04B 1/385; H04B 2001/3861; H04W 68/02
USPC .................................................. 455/420, 567
See application file for complete search history.

(56) References Cited

U.S. PATENT DOCUMENTS

| | | | | |
|---|---|---|---|---|
| 8,249,547 B1 * | 8/2012 | Fellner | ............... | G08B 21/0446 455/404.1 |
| 8,519,834 B2 * | 8/2013 | Jersa | ................... | H04M 19/047 340/4.12 |
| 8,589,667 B2 | 11/2013 | Mujtaba et al. | | |
| 8,611,930 B2 | 12/2013 | Louboutin et al. | | |
| 8,620,344 B2 | 12/2013 | Huang et al. | | |
| 8,626,465 B2 | 1/2014 | Moore et al. | | |

(Continued)

FOREIGN PATENT DOCUMENTS

| | | |
|---|---|---|
| WO | PCT/US2015/33406 | 5/2015 |
| WO | WO 2015/187510 | 12/2015 |

OTHER PUBLICATIONS

PCT Application No. PCT/US2015/033406 International Search Report and Written Opinion mailed Sep. 2, 2015.

*Primary Examiner* — Marcus Hammonds
(74) *Attorney, Agent, or Firm* — Polsinelli LLP

(57) ABSTRACT

Systems and methods for communications with wearable devices are provided. Information may be stored in memory regarding user preferences, which may indicate whether vibration notification is allowed at a wearable device and whether vibration notification is allowed at a mobile device. A communication may be received at a mobile device. It may then be determined whether the wearable device and the mobile device are connected. The wearable device may be caused to generate a vibration notification if the wearable device and the mobile device are determined to be connected. The mobile device may be caused to generate a vibration notification if the wearable device and the mobile device are determined not to be connected.

20 Claims, 10 Drawing Sheets

(56) References Cited

U.S. PATENT DOCUMENTS

| | | |
|---|---|---|
| 8,630,216 B2 | 1/2014 | Deivasigamani et al. |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |
| 8,793,094 B2 | 7/2014 | Tam et al. |
| 8,811,951 B1* | 8/2014 | Faaborg ............ H04M 1/57 |
| | | 340/384.1 |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,024,749 B2* | 5/2015 | Ratajczyk ............ G08B 7/06 |
| | | 340/539.11 |
| 2002/0115478 A1* | 8/2002 | Fujisawa ......... H04M 1/6505 |
| | | 455/567 |
| 2005/0272408 A1* | 12/2005 | Wilkes-Gibbs ...... H04M 19/04 |
| | | 455/412.2 |
| 2007/0026798 A1* | 2/2007 | Hoogstra ........... H04M 19/04 |
| | | 455/41.2 |
| 2007/0037605 A1* | 2/2007 | Logan ............ G08B 13/1427 |
| | | 455/567 |
| 2007/0087790 A1* | 4/2007 | Worick ............ H04M 19/041 |
| | | 455/567 |
| 2007/0265038 A1* | 11/2007 | Kim ................ H04M 1/7253 |
| | | 455/567 |
| 2008/0040665 A1 | 2/2008 | Waldeck |
| 2008/0300024 A1* | 12/2008 | Sweeney ............ H04B 1/385 |
| | | 455/567 |
| 2009/0088207 A1* | 4/2009 | Sweeney ............ H04M 19/04 |
| | | 455/557 |
| 2010/0227631 A1* | 9/2010 | Bolton ............. H04L 12/587 |
| | | 455/466 |
| 2011/0059769 A1* | 3/2011 | Brunolli ............ G08C 17/02 |
| | | 455/556.1 |
| 2012/0052922 A1* | 3/2012 | Li .................. H04M 19/04 |
| | | 455/567 |
| 2013/0040610 A1* | 2/2013 | Migicovsky ........ H04L 1/1867 |
| | | 455/412.2 |
| 2013/0303192 A1 | 11/2013 | Louboutin |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2014/0045480 A1* | 2/2014 | Hsieh ................. G06F 1/1643 |
| | | 455/418 |
| 2014/0045547 A1* | 2/2014 | Singamsetty ......... G06F 1/1643 |
| | | 455/552.1 |
| 2014/0062773 A1 | 3/2014 | MacGougan |
| 2014/0065962 A1 | 3/2014 | Le |
| 2014/0071221 A1 | 3/2014 | Dave |
| 2014/0105084 A1 | 4/2014 | Chhabra |
| 2014/0106677 A1* | 4/2014 | Altman ............... H04B 1/3827 |
| | | 455/41.2 |
| 2014/0139380 A1 | 5/2014 | Ouyang |
| 2014/0141803 A1 | 5/2014 | Marti |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0247279 A1 | 9/2014 | Nicholas |
| 2014/0247280 A1 | 9/2014 | Nicholas |
| 2014/0269562 A1 | 9/2014 | Burchill |
| 2014/0273849 A1* | 9/2014 | Lee ................. G06F 3/017 |
| | | 455/41.2 |
| 2014/0274010 A1* | 9/2014 | Cavallaro ............ H04B 1/385 |
| | | 455/418 |
| 2014/0274150 A1 | 9/2014 | Marti |
| 2014/0283135 A1 | 9/2014 | Shepherd |
| 2014/0293959 A1 | 10/2014 | Singh |
| 2014/0344375 A1* | 11/2014 | Hauser ............... H04L 51/04 |
| | | 709/206 |
| 2014/0364089 A1 | 12/2014 | Lienhart |
| 2014/0364148 A1 | 12/2014 | Block |
| 2014/0365120 A1 | 12/2014 | Vulcano |
| 2015/0011242 A1 | 1/2015 | Nagaraj |
| 2015/0026623 A1 | 1/2015 | Horne |
| 2015/0031397 A1 | 1/2015 | Jouaux |
| 2015/0065055 A1* | 3/2015 | Newham ............. H04W 4/008 |
| | | 455/41.3 |
| 2015/0073907 A1* | 3/2015 | Purves ............... G06Q 20/32 |
| | | 705/14.58 |
| 2015/0296480 A1* | 10/2015 | Kinsey ............... H04W 4/008 |
| | | 455/41.3 |
| 2015/0312392 A1* | 10/2015 | Smereka ............ H04M 1/72519 |
| | | 455/415 |
| 2016/0198319 A1* | 7/2016 | Huang ............... H04L 67/26 |
| | | 455/412.2 |

* cited by examiner

600

| | Button One 605 | Button Two 610 | Button Three 615 | Accelerometer 620 | Command 625 |
|---|---|---|---|---|---|
| Example 1 630 | Hold 4 seconds | Hold 4 seconds | Hold 4 seconds | | Communicate emergency mode to handheld smart device |
| Example 2 635 | Tap 1 Tap 2 Tap 3 | | | | Place phone into "night mode" |
| Example 3 640 | | Tap 1 Tap 2 Tap 3 | | | Allow only emergency calls |
| Example 4 645 | Tap 1 Tap 2 | | Tap 1 Tap 2 | | Tap sequence "learn mode: home night mode" |
| Example 5 650 | Tap 1 | Tap 2 | Tap 3 | | Review all texts |
| Example 6 655 | Tap 1 | | | Vigorous motion for greater than 1 minutes | Exercise mode |
| Example 7 660 | | | | Vigorous motion for greater than 1 minutes | Notify handheld of possible emergency |
| Example 8 665 | | Tap 1 Tap 2 Hold 4 seconds | | | Delete email |

FIGURE 6

COMMUNICATIONS WITH WEARABLE DEVICES

CROSS-REFERENCE TO RELATED APPLICATIONS

The present application claims the priority benefit of U.S. provisional application No. 62/007,897 filed Jun. 4, 2014 and entitled "Communications with Wearable Devices," the disclosure of which is hereby incorporated by reference.

BACKGROUND

1. Field of the Invention

An embodiment of the invention relate to providing a sharing and app of a user's first mobile device with a second mobile device. More specifically, the present invention relates to optimizing memory for a wearable device.

2. Description of the Related Art

Mobile device software applications are a significant and growing portion of the smartphone industry. Mobile applications are designed to run on smartphones, tablet computers (including electronic reading devices or e-readers), and other mobile devices. apps may be made available by application developers through application distribution platforms, many of which are typically operated by the owner of the mobile operating system, such as the Apple® App Stores℠, Google Play™, Windows® Store, and BlackBerry® app World™. Some apps are available for free, while others must be bought. Usually, such apps are downloaded from the platform to a target device, such as an iPhone®, BlackBerry®, Android®, or Windows® phone, other mobile device, laptop, or desktop computer.

There are also a variety of different mobile devices with which applications may be shared. One category of such mobile devices may include wearable technology (e.g., smart watches, smart bracelets/cuffs). Such wearable technology may generally incorporate computing device functions into clothing or accessories that can be worn by the user. Some types of accessories may lack the full range of computing components or functions due to limitations relating to the ability to be worn (e.g., size, weight, structure, design). For example, a smart watch needs to be within a certain size and weight limitation to allow for wearing on a wrist of a user without obstructing normal movement. As such, a smart watch may not have the same memory capacity as other computing devices and may not be able to store or run the same types of applications.

As used herein, references to "smart watch" should be understood as being exemplary. The teachings herein may therefore pertain to any wearable device, including devices incorporated into or otherwise corresponding to clothing, jewelry, hatwear, and other items that can be worn by a user. Such wearable smart devices may likely possess buttons or similar means of collecting input from the user.

It is well known that handheld smart devices, such as smart phones, are able to synchronize with laptop and desktop computers, because such devices may be in communication with a common server. For example, if a user deletes an email on an app of their smart phone, the email will similarly appear deleted on their laptop. However, if a user possesses both a handheld smart device (e.g., smart phone) and a wearable smart device (e.g., smart watch), it is likely that these devices are not fully synchronized. For example, both smart devices are likely to receive simultaneous notifications of an incoming text or email.

Because handheld and wearable smart devices do not typically share a common server, full synchronization between the two devices may be difficult to achieve. Communication in general between the devices may also be limited, which may lead to the user experiencing multiple notifications for a single event. For instance, when a text message is received, both the handheld and wearable smart devices may vibrate, which may be a nuisance for the user. If the user attempts to minimize these notifications by directing all notifications to the wearable device, the user may miss the notification if the wearable device is not currently being worn. There is no simple method to consistently direct notifications to the desired device and ensure that the notification is actually received.

There is, therefore, a need in the art for improved systems and methods for communications with wearable devices.

SUMMARY OF THE CLAIMED INVENTION

Embodiments of the present invention provide systems and methods for communications with wearable devices. Information may be stored in memory regarding user preferences, which may indicate whether vibration notification is allowed at a wearable device and whether vibration notification is allowed at a mobile device. A communication may be received at a mobile device. It may then be determined whether the wearable device and the mobile device are connected. The wearable device may be caused to generate a vibration notification if the wearable device and the mobile device are determined to be connected. The mobile device may be caused to generate a vibration notification if the wearable device and the mobile device are determined not to be connected.

Various embodiments may include methods for communications with wearable devices. Such methods may include storing information in memory regarding user preferences indicating whether vibration notification is allowed at a wearable device and whether vibration notification is allowed at a mobile device, receiving a communication at a mobile device, the communication sent over a communication network, determining whether the wearable device and the mobile device are connected, causing the wearable device to generate a vibration notification if the wearable device and the mobile device are determined to be connected, and causing the mobile device to generate a vibration notification if the wearable device and the mobile device are determined not to be connected.

Further embodiments may include systems for communications with wearable devices. Such systems may include memory that stores information regarding user preferences, indicating whether vibration notification is allowed at a wearable device and whether vibration notification is allowed at a mobile device, a communication interface that receives a communication at a mobile device, the communication sent over a communication network, and a processor that executes instructions to determine whether the wearable device and the mobile device are connected, to cause the wearable device to generate a vibration notification if the wearable device and the mobile device are determined to be connected, and to cause the mobile device to generate a vibration notification if the wearable device and the mobile device are determined not to be connected.

Still further embodiments of the present invention may further include non-transitory computer-readable storage media, having embodied thereon a program executable by a processor to perform methods for communications with wearable devices as described herein.

BRIEF DESCRIPTION OF THE DRAWINGS

FIG. 6 is illustrates an exemplary database that may be used in a system for communications with wearable device.

DETAILED DESCRIPTION

Various embodiments of the present invention provide systems and methods for optimizing memory for a wearable device. The operating system of a handheld smart device may enabled to accept information from the user that directs notifications to either a handheld or wearable smart device in a systematic way. Using user-customizable software on the handheld smart device, notifications may be properly directed and delivered. The user-created programs may make use of wearable device's buttons and accelerometer to communicate information back to the handheld device.

Figure 1:
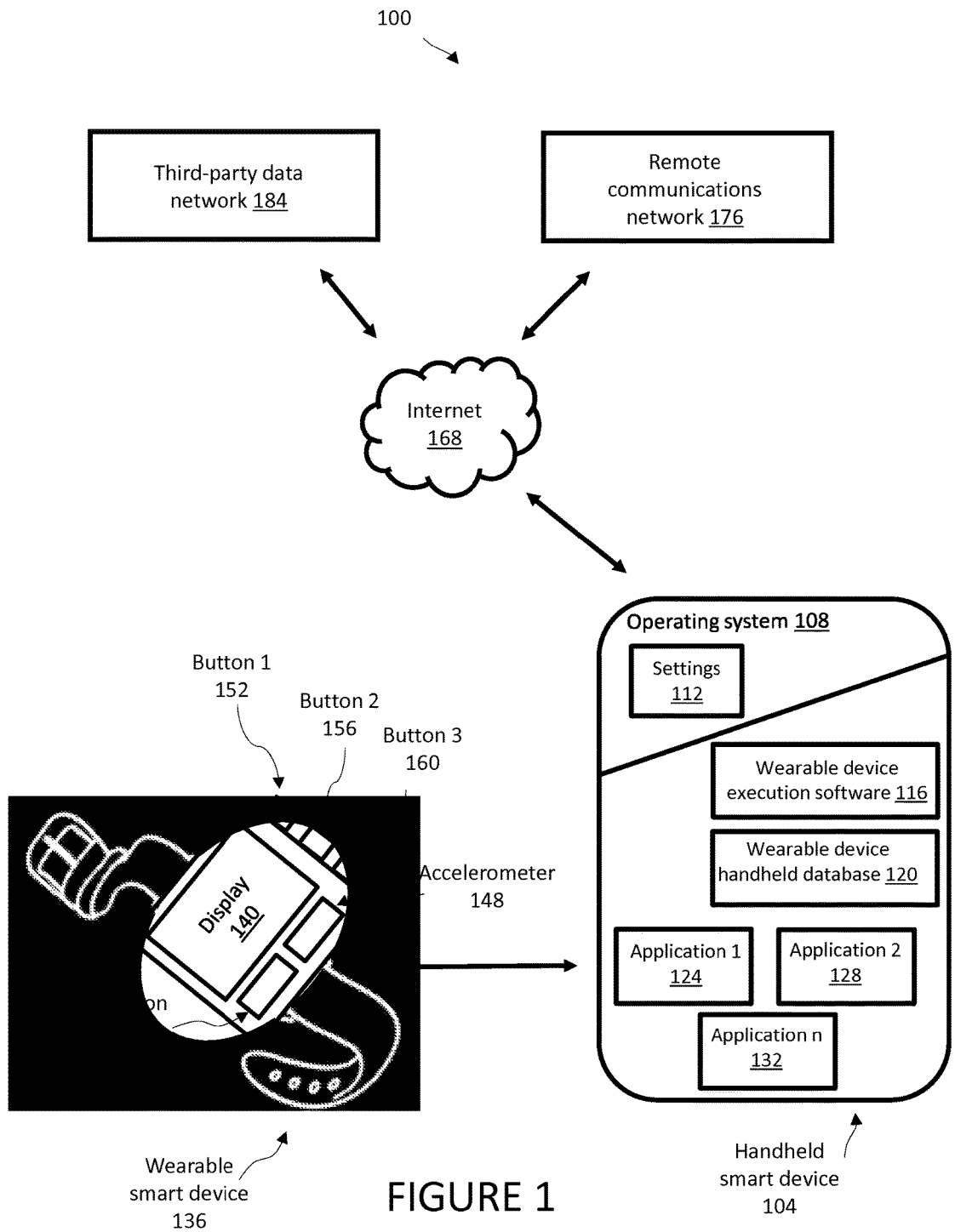
FIG. 1 illustrates an exemplary network environment in which a system for communications with wearable devices may be implemented.

FIG. 1 illustrates an exemplary network environment 100 in which a system for communications with wearable devices may be implemented. Network environment 100 may include handheld smart device 104 (with operating system 108, settings 112, wearable device execution software 116, wearable device handheld database 120, and applications 1-n 124-132), wearable smart device 136 (with display 140, vibration motor 144, accelerometer 148, and buttons 1-3 152-160), internet 168, remote communications network 176, and third party database network 184.

Users may use any number of different handheld electronic devices 104, such as mobile phones, smartphones, personal digital assistants (PDAs), portable computing devices (e.g., laptop, netbook, tablets), handheld computing device, or any other type of computing device capable of communicating over communication network 168. User devices 104 may also be configured to access data from other storage media, such as memory cards or disk drives as may be appropriate in the case of downloaded services. User device 104 may include standard hardware computing components such as network and media interfaces, non-transitory computer-readable storage (memory), and processors for executing instructions that may be stored in memory.

Operating system (OS) 108 is a collection of software that manages computer hardware resources and provides common services for computer programs, including applications 124-132. The operating system 108 is an essential component of the system software in a computer system. Applications 124-132 are usually developed for a specific operation system 108 and therefore rely on the associated operating system 108 to perform its functions. For hardware functions such as input and output and memory allocation, the operating system 108 acts as an intermediary between applications 124-132 and the computer hardware. Although application code is usually executed directly by the hardware, applications 124-132 may frequently make a system call to an OS function or be interrupted by it. Operating systems 108 can be found on almost any device with computing or processing ability. Examples of popular modern operating systems include Android, BSD, iOS, Linux, OS X, QNX, Microsoft Windows, Windows Phone, and IBM z/OS. Most of these (except Windows, Windows Phone and z/OS) may share roots in UNIX.

Operating system settings 112 may be a software function that opens a display that lists OS functions that may be generated upon selection of a user interface button. Such a list of OS functions may be associated with various options that allow the user to designate certain preferences or settings with respect to how certain operating system functions are performed (e.g., display preferences, wireless network preferences, information sharing, accessibility of applications to system information, such as GPS/location, notifications). Once these settings 112 are set, the operating system 108 uses the settings 112 to perform various functions, which includes functions related to execution of an application 124-132.

Wearable device execution software 116 may be software designed to run on a smart device with the purpose of communicating with and executing commands on a wearable smart device. Such software may be specific to the wearable device 136 (e.g., Pebble smart watch app or Sony smart watch app).

Wearable device handheld database 120 may be an organized collection of data relevant to communications between a handheld device 104 and wearable smart device, which may include sequences of input signals received by the wearable smart device and correlated commands to be performed by the handheld smart device.

Applications 124-132 may include any number of software applications that may be installed on the user device 104, including native applications (e.g., Notes, Messages, Camera, FaceTime, Weather, etc. on iPhone) and downloaded applications (e.g., Facebook®, Twitter®, Instagram®).

As noted previously, smart watch 136 may include any wearable device. Such a wearable device may correspond to and be worn like a watch. Alternatively, the wearable device may correspond to other types of clothing, jewelry, other decorative accessory, etc. Such smart watch 136 may have some components and functions in common with handheld mobile device 104. In various instances, however, smart watch 136 may lack some components or ability to perform some functions (e.g., due to limitations related to wearability). Specific examples of wearable devices may include Pebble smart watch or Sony smart watch.

Remote communications network 176 and third party database network 184 may be databases associated with various entities other than the user. Remote communications network 176 and third party database network 184 may include or be associated with any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

The smart watch 136 may communicates with the mobile device 104 wirelessly through a communications channel 164, which may be a Bluetooth channel. Alternatively, the devices in network environment 100 may communicate via any communication network known in the art, which may be an wireless local area network such as Bluetooth, UTMS, or WiFi (e.g., a IEEE 802.11 protocol), or high frequency systems (e.g., 900 MHz, 2.4 GHz, and 5.6 GHz communications systems), or infrared, other relatively localized wireless communication protocol, or any combination thereof. In that regard, communications network 199 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

Figure 2:
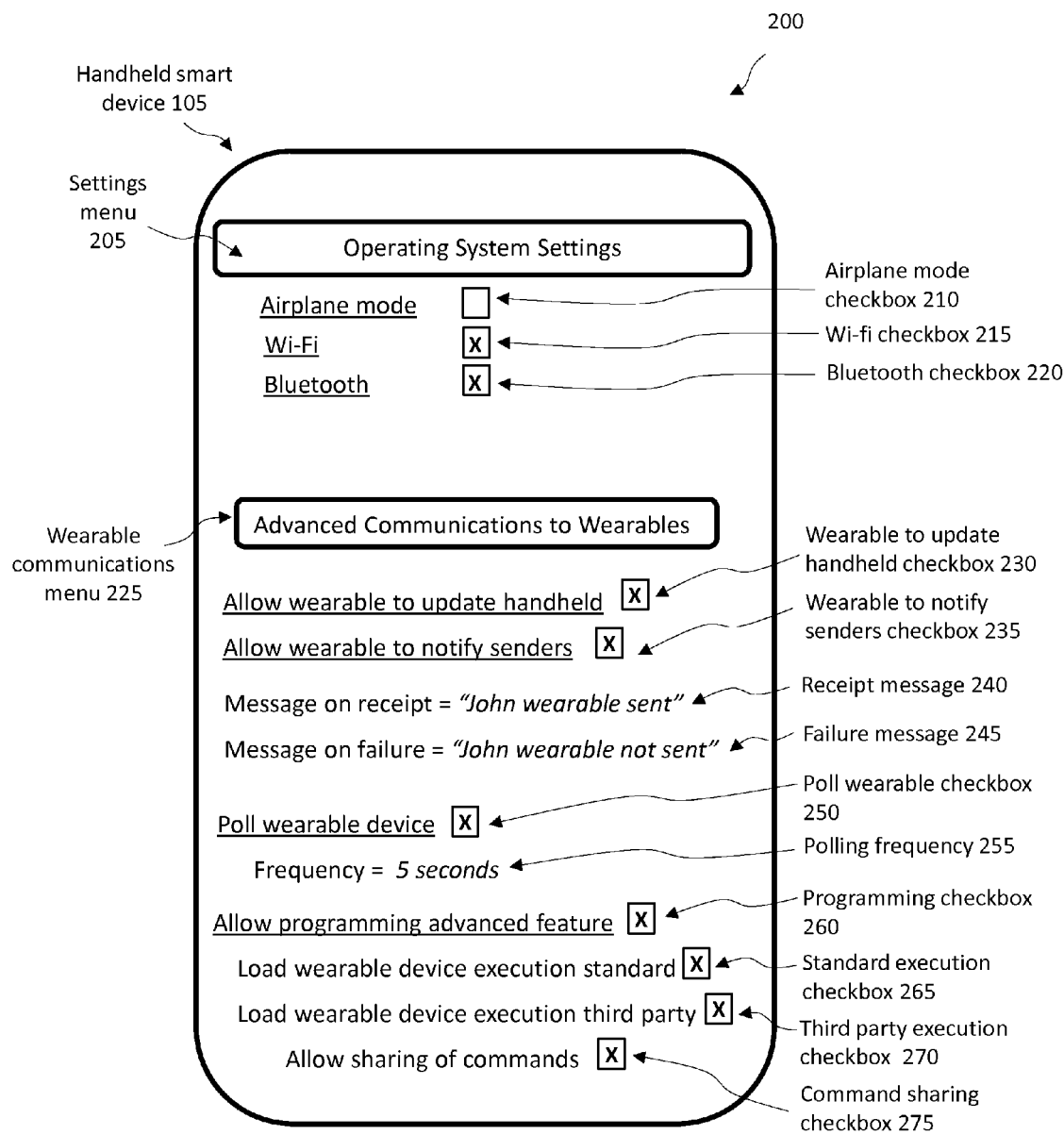
FIG. 2 is a diagram illustrating exemplary settings of an operating system on a user device that may be used with a system for communications with wearable devices.

FIG. 2 is a diagram illustrating exemplary settings 200 of an operating system on a user device 105 that may be used with a system for communications with wearable devices. Settings 200 may be displayed in settings menu 205 and may include such general settings as airplane mode 210, WiFi 215, and Bluetooth 220.

Settings 200 may further include, however, wearable communications menu 225, which may include options to enable wearable to update handheld 230, wearable to notify senders 235, receipt message 240, failure message 245, poll wearable 250, programming 260, standard execution 265, third party execution 270, and command sharing 275.

Wearable to update handheld 230 is an option allowing the wearable device to send notification to the handheld device. Wearable to notify senders 235 is an option to notify a sender of a message that it has been routed through to the wearable device. When enabled, wearable to notify senders 235 may cause two different types of message to be sent to a sender: a receipt message 240 indicating successful receipt of the message at the wearable device and a failure message indicating failure to receive the message at the wearable device. The handheld may send the failure message.

Poll wearable 250 is an option that may enable periodic polling of the wearable smart device by the wearable device execution software. Programming 260 is an option that may enable the use of specific programs regarding communications between the wearable and handheld smart devices. Standard execution 265 is an option that may enable the use of standard programs in the wearable device execution software. Third party execution 270 is an option that may enable the use of third-party programs in the wearable device execution software. Command sharing 275 is an option that may enable the communication of program commands to the third-party data network.

Figure 3:
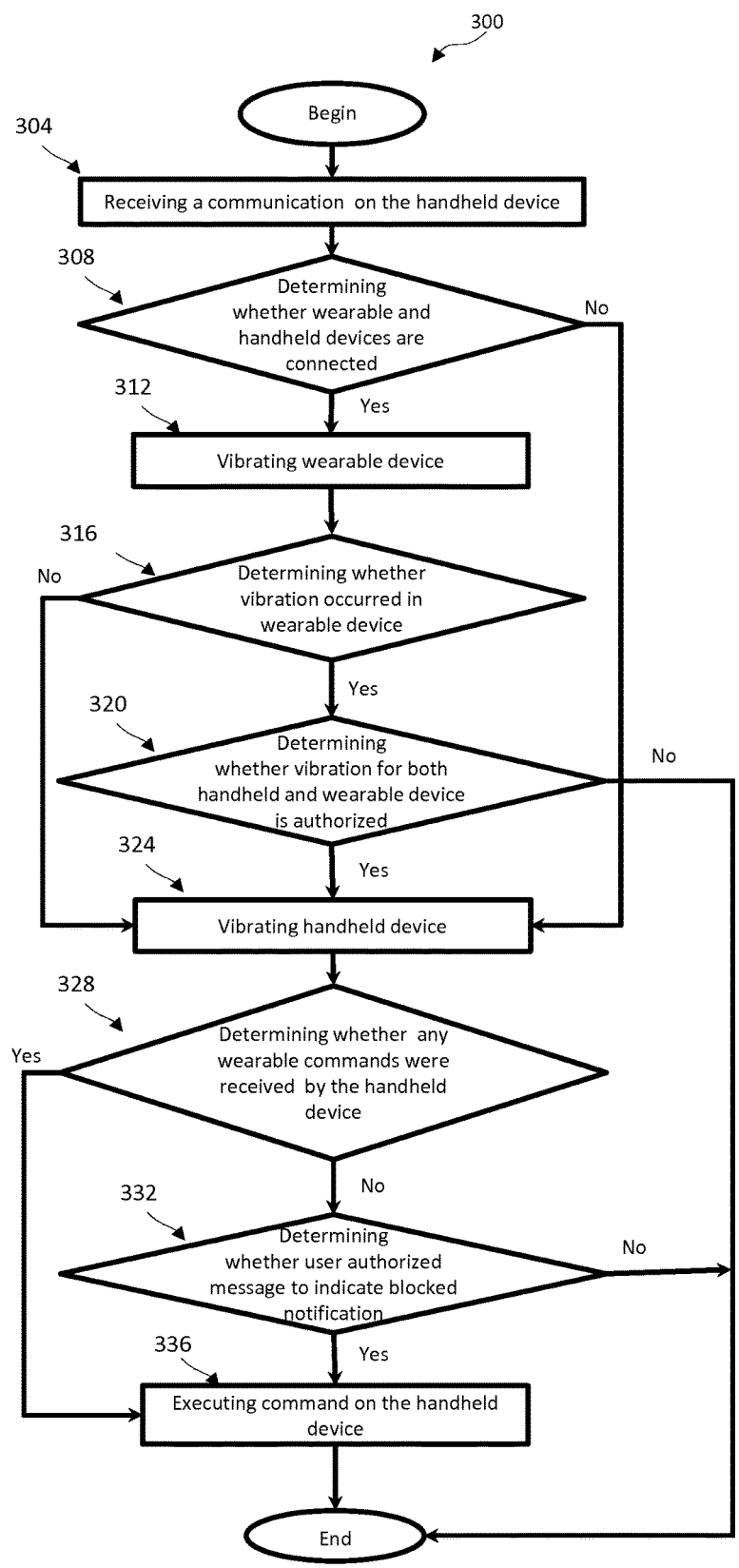
FIG. 3 is a flowchart illustrating an method for communications with wearable devices.

FIG. 3 is a flowchart illustrating an method 300 for communications with wearable devices. In step 304, a communication is received at a handheld device. In step 308, it may be determined whether a connection exists between the handheld and a wearable device. If yes, the method proceeds to step 312 where the wearable device is vibrated. If not, the method proceeds to step 324 where the handheld is vibrated.

From step 312, the method proceeds to step 316 in which it may be determined whether the wearable actually occurred. If not, the method proceeds to step 324 where the handheld is vibrated. If yes, the method may proceed to step 320 where it may be determined whether vibration is authorized for both devices.

From step 320, if the user has authorized vibration of both devices, the method proceeds to step 324 where the handheld is vibrated. If the user has not authorized vibration of both devices, the method ends.

From step 320, the method proceeds to step 328 in which it may be determine whether any wearable command were received by the handheld. If yes, the method proceeds to step 336 where the command is executed. If no, the method proceeds to step 332 where it may be determined whether the user authorized a message display to indicate blocked notification.

If the user has authorized the message display, the method proceeds to step 336 for execution of the command. If the user has not authorized the message display, the method ends.

Figure 4:
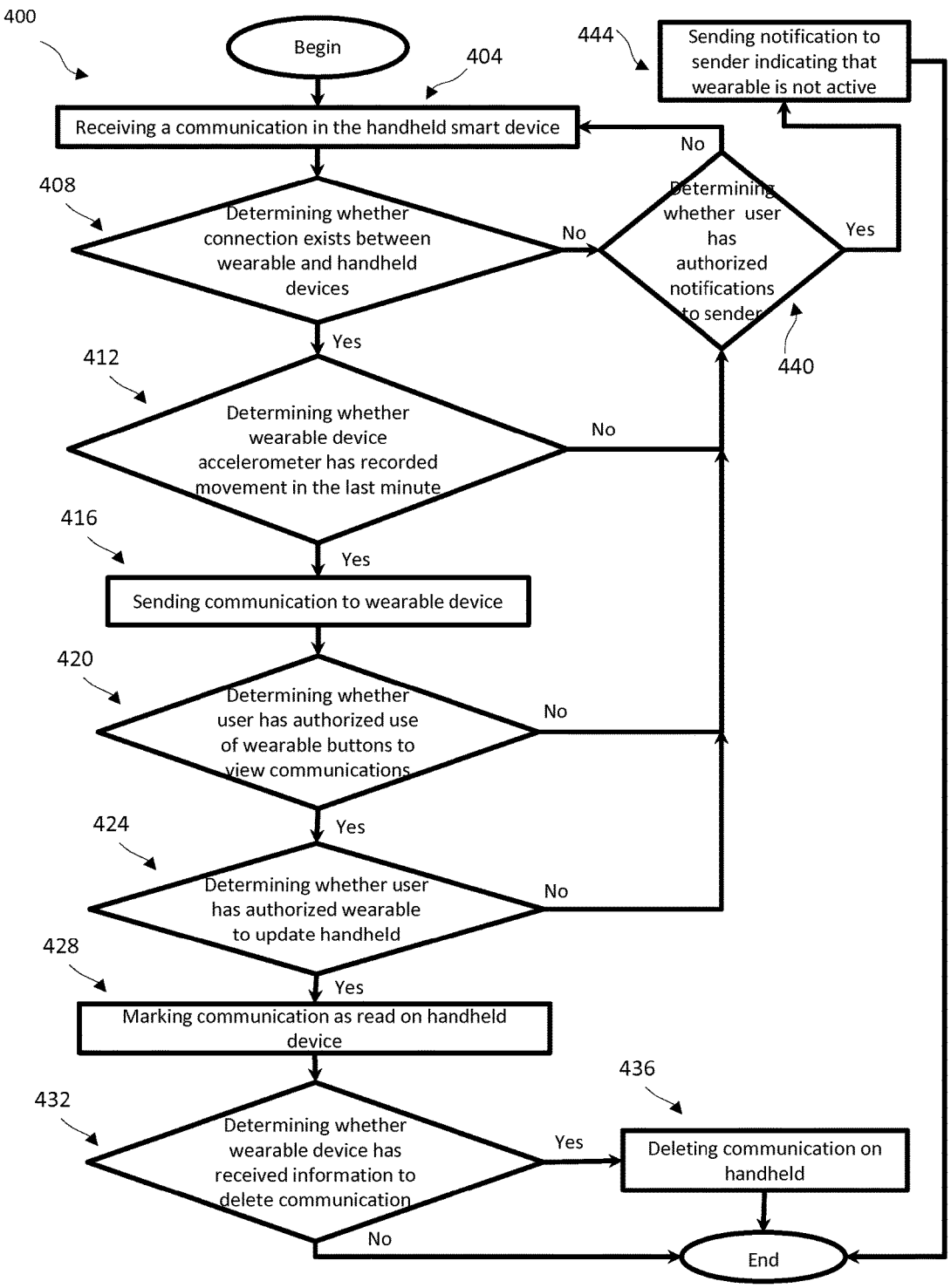
FIG. 4 is a flowchart illustrating an alternate method for communications with wearable devices.

FIG. 4 is a flowchart illustrating an alternate method 400 for communications with wearable devices. In step 404, a communication is received at the handheld. In step 408, it may be determined whether a connection exists between the handheld and a wearable device. If yes, the method proceeds to step 412 where it may be determined whether the wearable device accelerometer has recorded movement in the last minute. If no, the method proceeds to step 440.

From step 412, if the wearable device accelerometer has recorded movement, the communication may be sent to the wearable device in step 416. If the wearable device accelerometer has not recorded movement, the method proceeds to step 440.

From step 416, the method proceeds to step 420 in which it may be determined whether the user has authorized use of wearable buttons to view communications. If not, the method proceeds to step 440. If the user has authorized wearable buttons, the method proceeds to step 424 in which it may be determined whether the user has authorized the wearable device to update the handheld. If not, the method proceeds to step 440. If the user has authorized the wearable device to update the handheld, the method may proceed to step 428 in which the communication may be marked as read on the handheld device.

From step 428, the method proceeds to step 432 in which it may be determine whether the wearable device has received information to delete the communication. If no, the method ends. If yes, the method proceeds to step 436 in which the communication is deleted before the method ends.

From step 440, it may be determine whether the user has authorized notifications to the sender. If yes, the method proceeds to step 444 in which the sender notification is sent before the method ends. If no, the method returns to step 404 when a next communication is received.

Figure 5:
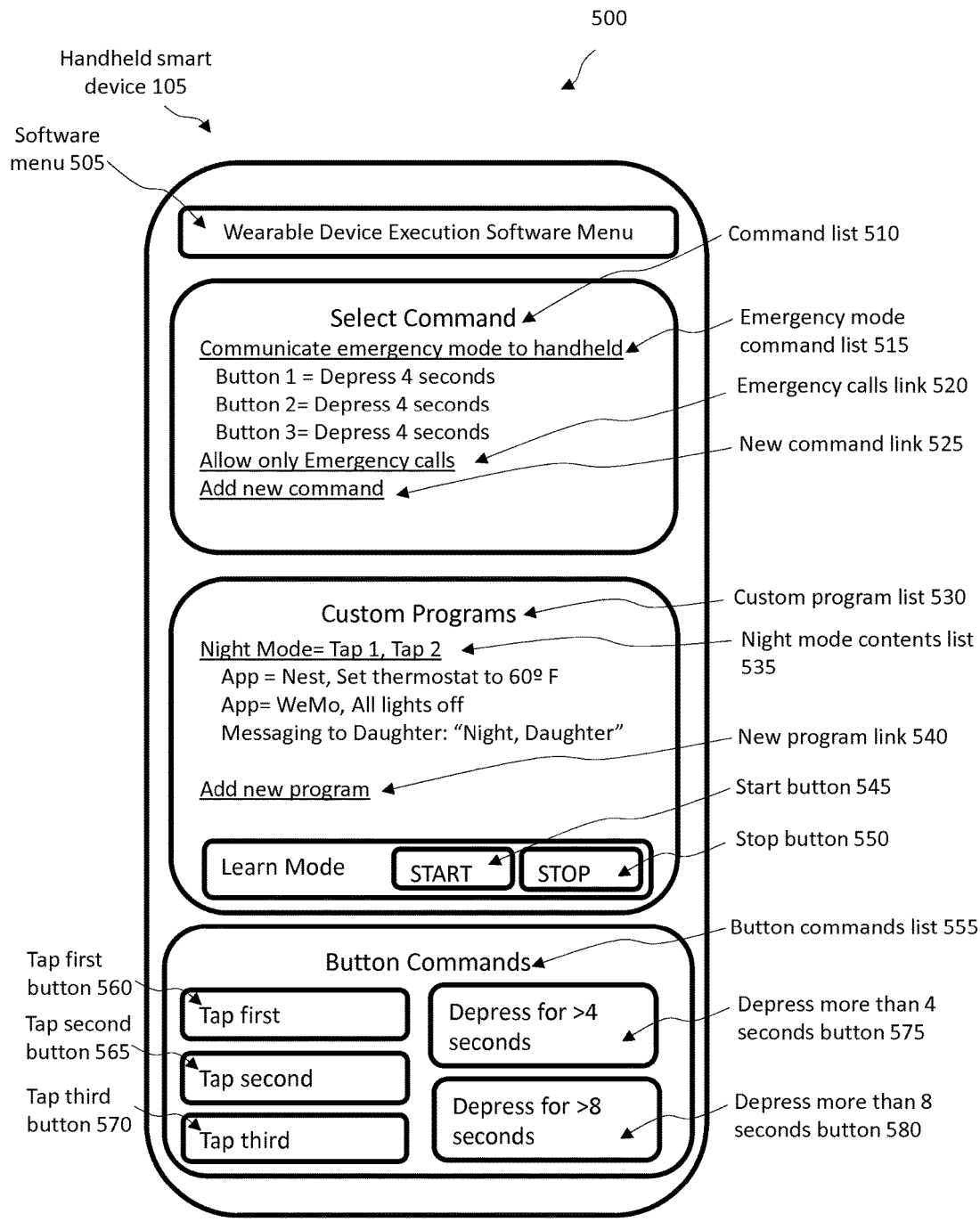
FIG. 5 illustrates exemplary menus displayed on a mobile device that may be used in a system for communications with wearable devices.

FIG. 5 illustrates exemplary menus 500 displayed on a mobile device 105 that may be used in a system for communications with wearable devices. Specifically, there may be a wearable device execution software menu 505, which provide the user with the ability to define certain commands or programs associated with actions on the wearable device buttons. In the illustrated example, a command to communicate emergency mode to the handheld may be defined under the command list 510 as depressing all three buttons for 4 seconds.

Under wearable device execution software menu 505, there may be a command list 510 with such commands as emergency mode command list 515, emergency call link 520, and new command link 525.

Wearable device execution software menu 505 may further include a custom programs list 530, which may include such programs as night mode contents list, new program link 540, start button 545, and stop button 550. Learn mode allows for the mobile device to learn which apps or functions are to be associated with a set of gestures or button taps/presses.

Wearable device execution software menu 505 may further include a buttons command list 555, including button commands for tap first button 530, tap second button 565, tap third button 570, depress for more than 4 seconds button 575, and depress more than 8 seconds button 580.

FIG. 6 is illustrates an exemplary database 600 that may be used in a system for communications with wearable device. Database 600 stores information regarding various commands. The stored information may include button one information 605, button two information 610, button three information 615, accelerometer information 620, and a command description 625. Each row 630-665 represents a different command and different button/accelerometer contexts associated with the command.

For example, command example 1 630 may be defined as when button one 605, button two 610, and button three 615 are held for 4 seconds. When such a combination of button presses is detected, the associated command is identified as communicating emergency mode to the handheld devices. Other command examples (e.g., command example 6 655) may further incorporate the accelerometer, such that detection of motion for a period of time (e.g., greater than 1 minute) may indicate that the device should be put in exercise mode.

Figure 7:
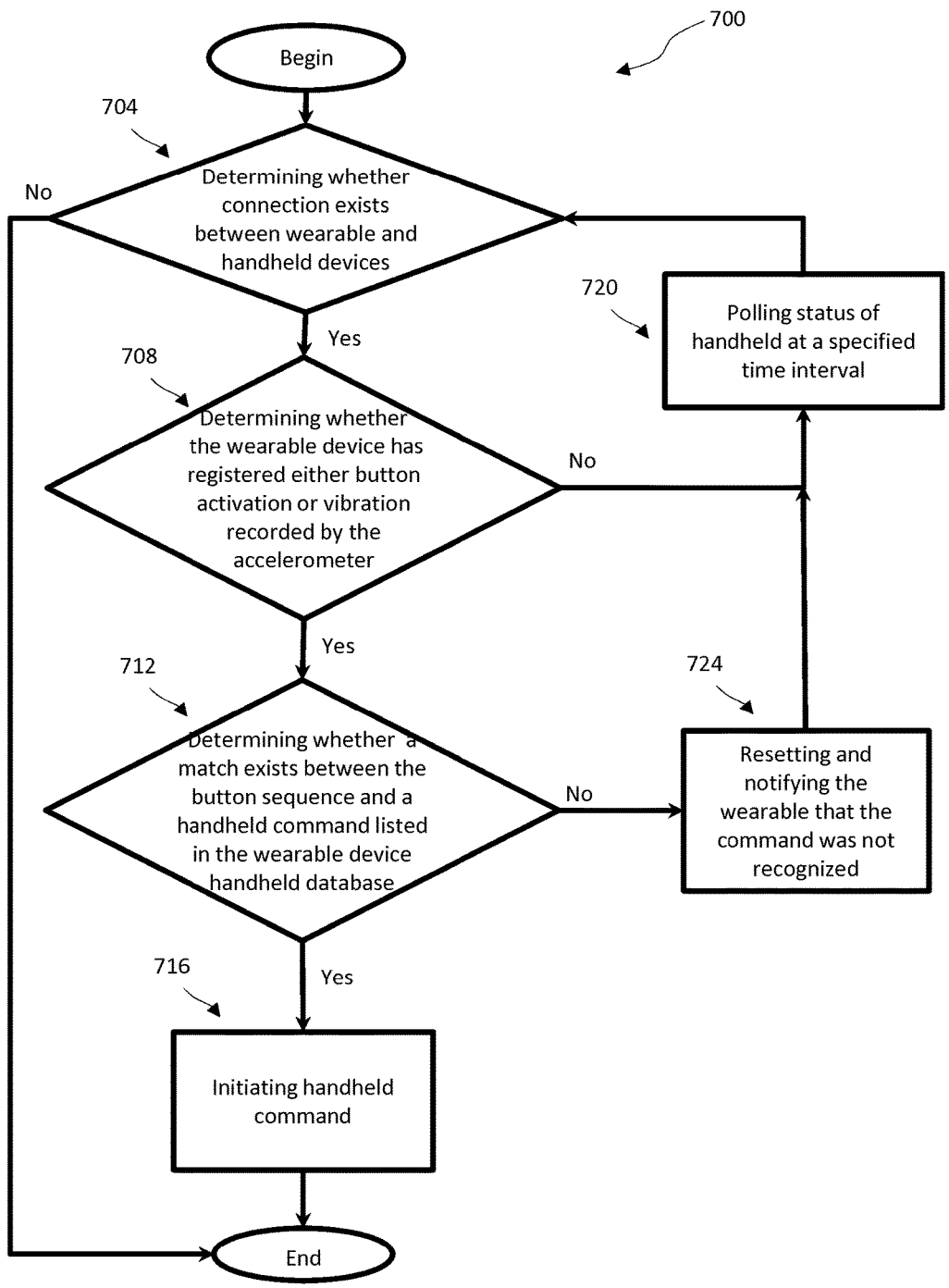
FIG. 7 is a flowchart illustrating yet another alternate method for communications with wearable devices.

FIG. 7 is a flowchart illustrating yet another alternate method 700 for communications with wearable devices. In step 704, it may be determined whether a connection exists between the wearable and the handheld devices. If not, the method ends. If yes, the method proceeds to step 708 in which it may be determine whether the wearable device has registered either button activation or vibration recorded by the accelerometer.

If not, the method proceeds to step 720. If the wearable device has registered either button activation or vibration recorded by the accelerometer, the method may proceed to step 712 where it may be determined whether a match exists between the button sequence and a handheld command listed in the wearable device handheld database.

If a match does exist, the method proceeds to step 716 in which the handheld command is initiated before the method ends. If not the method proceeds to step 724, in which the wearable is reset and notified that the command was not recognized.

From step 724, the method proceeds to step 720 in which the handheld is polled as to its status at a specified time interval before returning back to step 704.

Figure 8:
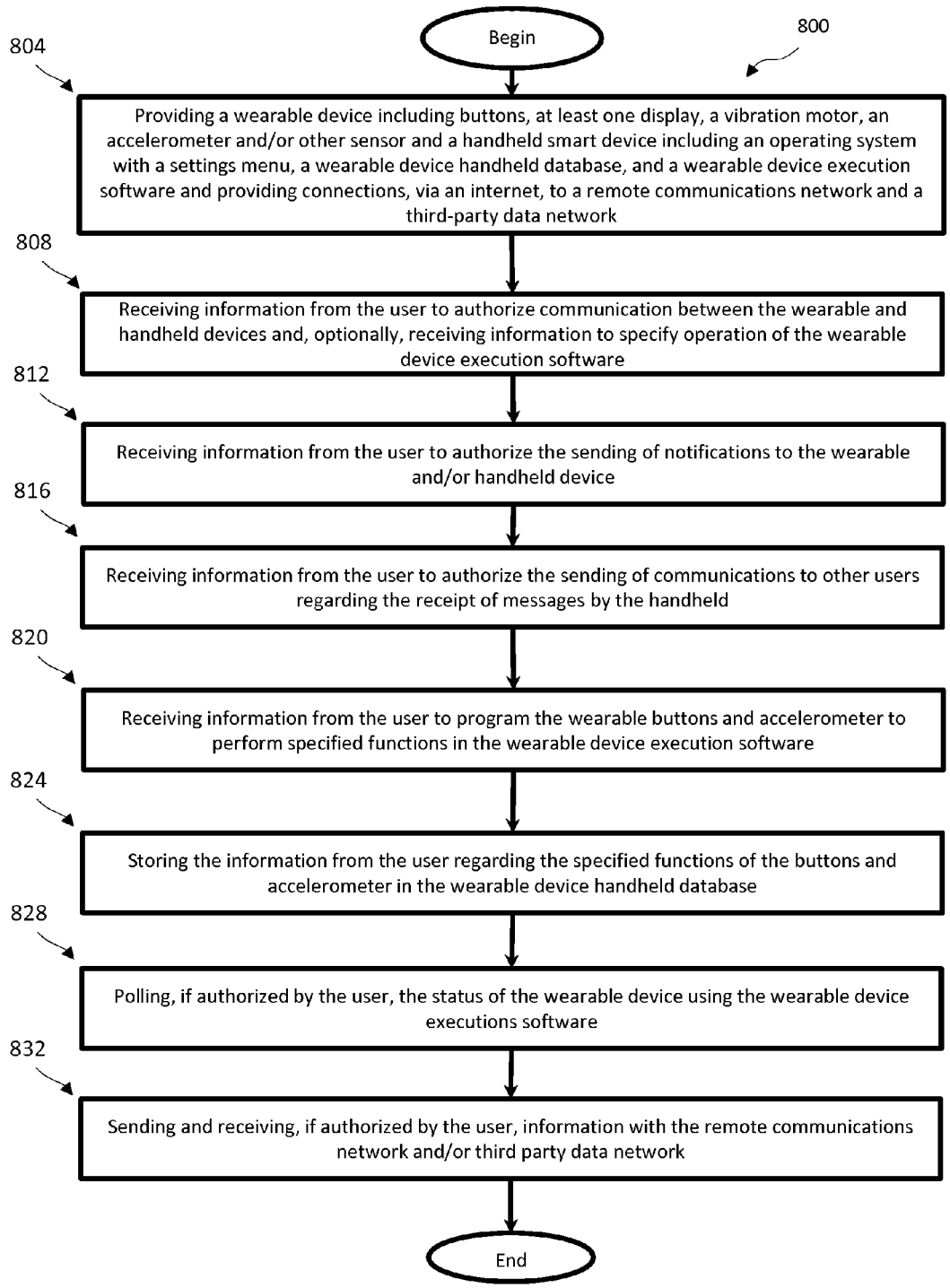
FIG. 8 is a flowchart illustrating yet another alternate method for communications with wearable devices.

FIG. 8 is a flowchart illustrating yet another alternate method 800 for communications with wearable devices. In step 804, a wearable device may be provided with buttons, at least one display, a vibration motor, an accelerometer (and/or another sensor), and a handheld smart device may be provided with an operating system, settings menu, a wearable device handheld database, and a wearable device execution software. Further, communication channels may be provided via an internet to a remote communications network and a third-party data network.

In step 808, information may be received from the user authorizing communication between the wearable and handheld devices. In some embodiments, the received information may further specify operation of the wearable device execution software.

In step 812, information may be received from the user authorizing the sending of notifications to the wearable and/or handheld device. In step 816, information may be received from the user authorizing sending of notifications to other users regarding receipt of messages at the handheld.

In step 820, information may be received from the user that programs the wearable buttons and accelerometer to perform specified functions in the wearable device execution software. In step 824, the information received from the user regarding the specified functions of the buttons and accelerometer in the wearable device handheld database may be stored.

In step 828, polling may occur if authorized by the user. Such polling may pertain to the status of the wearable device using the wearable device execution software. In step 832, information may be shared with the remote communications network and/or third party data network, if authorized by the user. Such sharing may be reciprocal as the user may provide their own information as to how they use their wearable device, as well as receive the information regarding wearable device use by other users.

Figure 9:
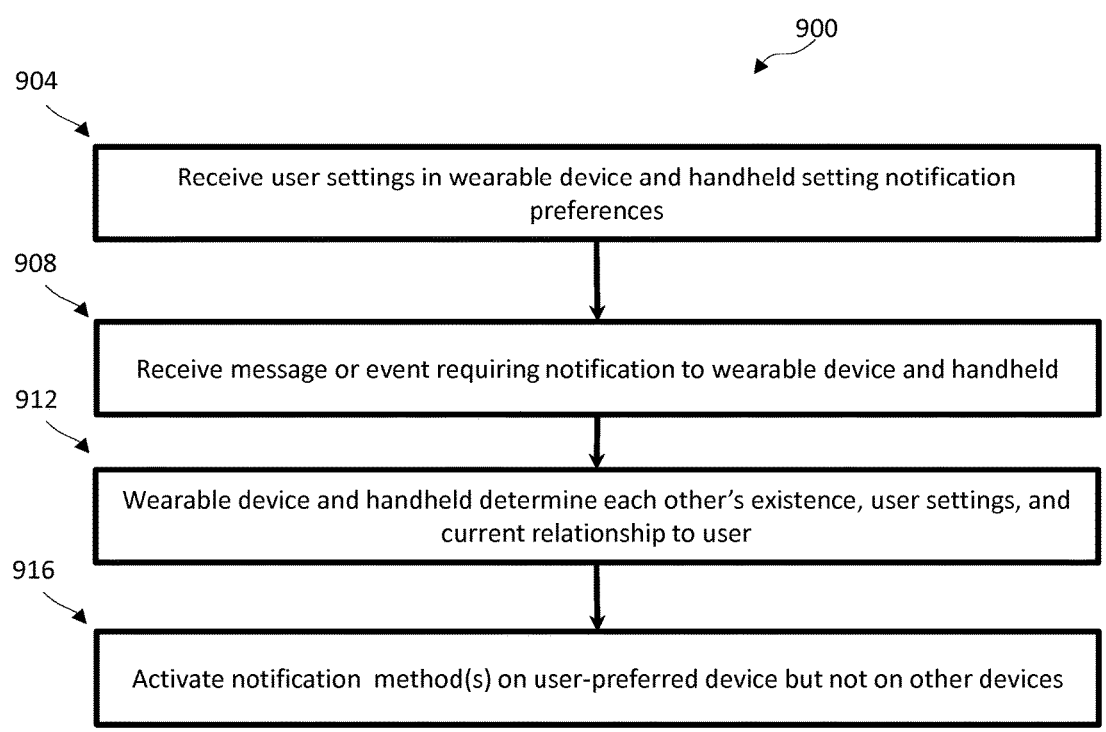
FIG. 9 is a flowchart illustrating yet another alternate method for communications with wearable devices.

FIG. 9 is a flowchart illustrating yet another alternate method 900 for communications with wearable devices. In step 904, user settings may be received regarding preferences as to wearable device and handheld device notifications. In step 908, a message or event requiring notification may be received.

In step 912, the wearable device and handheld device verify each other's existence, settings, and current relationship to the user. In step 916, notifications may be activated on the user-preferred device for receiving such notifications. The device that is not preferred may not be enabled or activated to receive notifications.

Figure 10:
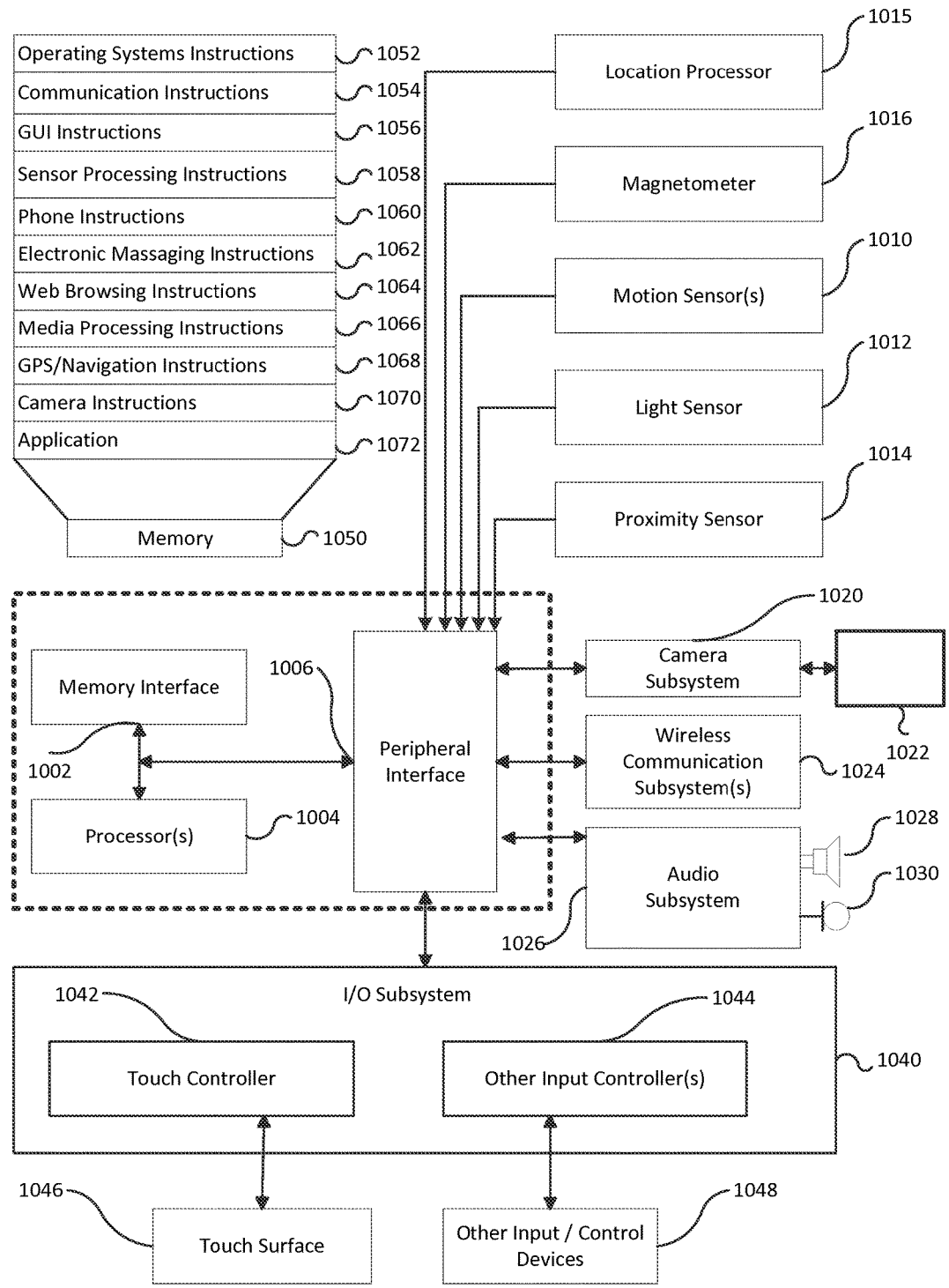
FIG. 10 is a diagram illustrating exemplary device architecture of an exemplary user device that may be used in a system for communications with wearable devices.

FIG. 10 illustrates a mobile device architecture 1000 that may be utilized to implement the various features and processes described herein. Architecture 1000 can be implemented in any number of portable devices including but not limited to smart phones, electronic tablets, and gaming devices. Architecture 1000 as illustrated in FIG. 10 includes memory interface 1002, processors 1004, and peripheral interface 1006. Memory interface 1002, processors 1004 and peripherals interface 1006 can be separate components or can be integrated as a part of one or more integrated circuits. The various components can be coupled by one or more communication buses or signal lines.

Processors 1004 as illustrated in FIG. 10 is meant to be inclusive of data processors, image processors, central processing unit, or any variety of multi-core processing devices. Any variety of sensors, external devices, and external subsystems can be coupled to peripherals interface 1006 to facilitate any number of functionalities within the architecture 1000 of the exemplar mobile device. For example, motion sensor 1010, light sensor 1012, and proximity sensor 1014 can be coupled to peripherals interface 1006 to facilitate orientation, lighting, and proximity functions of the mobile device. For example, light sensor 1012 could be utilized to facilitate adjusting the brightness of touch surface 1046. Motion sensor 1010, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 1006, such as a temperature sensor, a biometric sensor, or other sensing device to facilitate corresponding functionalities. Location processor 1015 (e.g., a global positioning transceiver) can be coupled to peripherals interface 1006 to allow for generation of geo-location data thereby facilitating geo-positioning. An electronic magnetometer 1016 such as an integrated circuit chip could in turn be connected to peripherals interface 1006 to provide data related to the direction of true magnetic North whereby the mobile device could enjoy compass or directional functionality. Camera subsystem 1020 and an optical sensor 1022 such as a charged coupled device (CCD) or a complementary metaloxide semiconductor (CMOS) optical sensor can facilitate camera functions such as recording photographs and video clips.

Communication functionality can be facilitated through one or more communication subsystems 1024, which may include one or more wireless communication subsystems. Wireless communication subsystems 1024 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 1024 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 1024 may include hosting protocols such that the device may be configured as a base station for other wireless devices. Communication subsystems can also allow the device to synchronize with a host device using one or more protocols such as TCP/IP, HTTP, or UDP.

Audio subsystem 1026 can be coupled to a speaker 1028 and one or more microphones 1030 to facilitate voice-enabled functions. These functions might include voice recognition, voice replication, or digital recording. Audio subsystem 1026 in conjunction may also encompass traditional telephony functions.

I/O subsystem 1040 may include touch controller 1042 and/or other input controller(s) 1044. Touch controller 1042 can be coupled to a touch surface 1046. Touch surface 1046 and touch controller 1042 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 1046 may likewise be utilized. In one implementation, touch surface 1046 can display virtual or soft buttons and a virtual keyboard, which can be used as an input/output device by the user.

Other input controllers 1044 can be coupled to other input/control devices 1048 such as one or more buttons, rocker switches, thumb-wheels, infrared ports, USB ports, and/or a pointer device such as a stylus. The one or more buttons (not shown) can include an up/down button for volume control of speaker 1028 and/or microphone 1030. In some implementations, device 1000 can include the functionality of an audio and/or video playback or recording device and may include a pin connector for tethering to other devices.

Memory interface 1002 can be coupled to memory 1050. Memory 1050 can include high-speed random access memory or non-volatile memory such as magnetic disk storage devices, optical storage devices, or flash memory. Memory 1050 can store operating system 1052, such as Darwin, RTXC, LINUX, UNIX, OS X, ANDROID, WINDOWS, or an embedded operating system such as VxWorks. Operating system 1052 may include instructions for handling basic system services and for performing hardware dependent tasks. In some implementations, operating system 1052 can include a kernel.

Memory 1050 may also store communication instructions 1054 to facilitate communicating with other mobile computing devices or servers. Communication instructions 1054 can also be used to select an operational mode or communication medium for use by the device based on a geographic location, which could be obtained by the GPS/Navigation instructions 1068. Memory 1050 may include graphical user interface instructions 1056 to facilitate graphic user interface processing such as the generation of an interface; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes, camera instructions 1070 to facilitate camera-related processes and functions; and instructions 1072 for any other application that may be operating on or in conjunction with the mobile computing device. Memory 1050 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 1050 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for device communications, the method comprising:
receiving one or more notification preferences via a user interface, wherein the one or more notification preferences identify at least that a wearable device is authorized to perform vibration-based communication-receipt notifications;
storing the one or more notification preferences within a memory of the mobile device;
receiving a viewable communication at a mobile device communicatively coupled to the wearable device, the viewable communication sent over a communication network;
transmitting the viewable communication from the mobile device to the wearable device, thereby triggering a vibration-based communication receipt notification at the wearable device;
receiving a read update from the wearable device at the mobile device, the read update identifying that the viewable communication has been viewed via the wearable device; and
executing instructions stored in the memory of the mobile device, wherein execution of the instructions by a processor of the mobile device causes the mobile device to:
mark the viewable communication as read at the mobile device, and
identify a possible emergency based on the wearable device having been in motion for at least a predetermined duration of time.

2. The method of claim 1, wherein execution of the instructions by the processor of the mobile device further enters an exercise mode based on the wearable device having been in motion for at least a second predetermined duration of time.

3. The method of claim 1, wherein execution of the instructions by the processor of the mobile device further deletes the viewable communication at the mobile device.

4. The method of claim 1, wherein the viewable communication includes text.

5. The method of claim 1, further comprising vibrating the mobile device.

6. The method of claim 1, further comprising receiving a command input from the wearable device at the mobile device, the command input comprising at least one of button information based on a button of the wearable device and accelerometer motion information based on an accelerometer of the wearable device.

7. The method of claim 6, further comprising:
storing information in the memory of the mobile device regarding a first command of a plurality of commands, the first command associated with the command input;
retrieving the stored information upon receipt of the command input; and
executing the identified command upon receipt of the command input.

8. A system for device communications, the system comprising:
a display that displays a user interface;
an output device capable of outputting a notification;
an input interface that receives one or more user inputs during display of the user interface, the one or more inputs corresponding to receipt of one or more notification preferences, wherein the one or more notification preferences identify at least that a wearable device is authorized to perform vibration-based communication-receipt notifications;
a memory that stores at least the one or more notification preferences;
a communication interface, wherein the communication interface:
receives a viewable communication over a communication network,
transmits the viewable communication to the wearable device, and
receives a read update from the wearable device, the read update identifying that the viewable communication has been viewed via the wearable device; and
a processor that executes instructions stored in the memory, wherein the processor executes the instructions to:
mark the viewable communication as read, and
identify a possible emergency based on the wearable device having been in motion for at least a predetermined duration of time.

9. The system of claim 8, wherein execution of the instructions by the processor of the mobile device further enters an exercise mode based on the wearable device having been in motion for at least a second predetermined duration of time.

10. The system of claim 8, wherein execution of the instructions by the processor of the mobile device further deletes the viewable communication.

11. The system of claim 8, wherein the viewable communication includes text.

12. The system of claim 8, further comprising a vibration mechanism that vibrates.

13. The system of claim 8, wherein the communication interface receives a command input from the wearable device at the communication interface, the command input comprising at least one of button information based on a button of the wearable device and accelerometer motion information based on an accelerometer of the wearable device.

14. The system of claim 13, wherein the memory further stores information regarding a first command of a plurality of commands, the first command associated with the command input, and wherein the processor executes further instructions to retrieve the stored information upon receipt of the command input and to execute the identified command upon receipt of the command input.

15. A non-transitory computer-readable storage medium, having embodied thereon a program executable by a processor to perform a method for device communications, the method comprising:

receiving one or more notification preferences via a user interface, wherein the one or more notification preferences identify at least that a wearable device is authorized to perform vibration-based communication-receipt notifications;

storing the one or more notification preferences within a memory of the mobile device;

receiving a viewable communication at a mobile device communicatively coupled to the wearable device, the viewable communication sent over a communication network;

transmitting the viewable communication from the mobile device to the wearable device, thereby triggering a vibration-based communication-receipt notification at the wearable device;

receiving a read update from the wearable device at the mobile device, the read update identifying that the viewable communication has been viewed via the wearable device;

marking the viewable communication as read at the mobile device; and identifying a possible emergency based on the wearable device having been in motion for at least a predetermined duration of time.

16. The non-transitory computer-readable storage medium of claim 15, further comprising entering an exercise mode based on the wearable device having been in motion for at least a second predetermined duration of time.

17. The non-transitory computer-readable storage medium of claim 15, further comprising deleting the viewable communication at the mobile device.

18. The non-transitory computer-readable storage medium of claim 15, further comprising vibrating the mobile device.

19. The non-transitory computer-readable storage medium of claim 15, further comprising receiving a command input from the wearable device at the mobile device, the command input comprising at least one of button information based on a button of the wearable device and accelerometer motion information based on an accelerometer of the wearable device.

20. The non-transitory computer-readable storage medium of claim 19, further comprising:

storing information in the memory of the mobile device regarding a first command of a plurality of commands, the first command associated with the command input;

retrieving the stored information upon receipt of the command input; and executing the identified command upon receipt of the command input.

* * * * *